Oct. 19, 1943.  A. S. T. LAGAARD  2,332,237
DOUGHNUT MACHINE
Filed May 25, 1942  3 Sheets-Sheet 1

Inventor
Alexander S.T. Lagaard
By Caswell & Lagaard
Attorneys

Inventor
Alexander S. T. Lagaard

Inventor
Alexander S. T. Lagaard
By Caswell & Lagaard
Attorneys

Patented Oct. 19, 1943

2,332,237

UNITED STATES PATENT OFFICE 2,332,237

DOUGHNUT MACHINE

Alexander S. T. Lagaard, Minneapolis, Minn., assignor to Dough-King, Inc., Minneapolis, Minn., a corporation of Minnesota Application May 25, 1942, Serial No. 444,315

7 Claims. (Cl. 99—406)

My invention relates to doughnut machines and particularly to doughnut machines in which the doughnuts are progressed along a way through the flow of the cooking liquid.

An object of the invention resides in providing a flow regulator for controlling the velocity and direction of movement of the cooking liquid to procure uniform flow and regular travel throughout the extent of the way in which the cooking liquid is disposed.

Another object of the invention resides in providing a flow regulator for reducing turbulence occurring in the cooking liquid.

A still further object of the invention resides in providing a flow regulator adapted to be used in conjunction with the turner of the doughnut machine for reducing the turbulence created thereby.

An object of the invention resides in constructing the flow regulator with a deflecting surface traversing the way and disposed in angular relation with respect to the cooking liquid on leaving the turner.

A feature of the invention resides in constructing the flow regulator with a deflecting surface traversing the way and extending angularly upwardly away from the turner.

An object of the invention resides in constructing the flow regulator of inverted V-shaped cross-section.

A still further object of the invention resides in forming the flow regulator as part of the turner of the doughnut machine.

Other objects of the invention reside in the novel combination and arrangement of parts and in the details of construction hereinafter illustrated and/or described.

Figure 1:
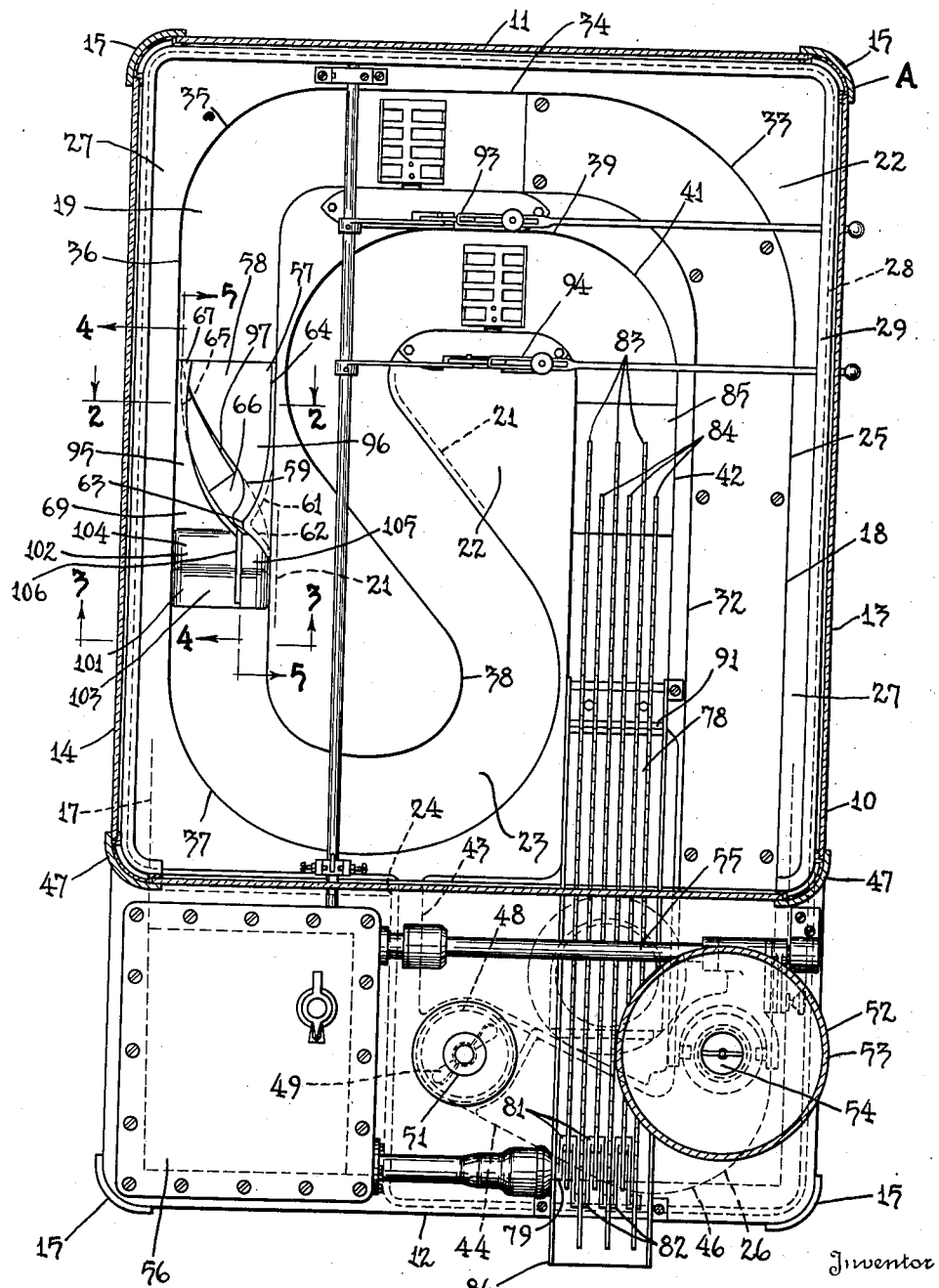
Fig. 1 is a plan sectional view of a doughnut machine illustrating an embodiment of my invention.

In the operation of doughnut machines in which the doughnuts are progressed along a way through the flow of the cooking liquid and in which a turner having a twisted passageway is employed for turning the doughnuts, considerable turbulence of the cooking liquid is produced in the way at the discharge end of the turner. This is particularly true when an appreciable drop in the elevation of the cooking liquid occurs through the turner. The instant invention produces a construction by means of which the cooking liquid leaving the turner is directed upwardly and toward the turbulence to reduce the turbulence and procure uniform flow through the channel.

In the drawings, I have shown a doughnut machine A which consists of a case 10 constructed with end walls 11 and 12, and side walls 13 and 14 connected therewith. The case 10 includes uprights 15 situated at the outer corners of the same and which extend throughout the height of the case and to which the various walls are attached. Secured to the various uprights 15 are channel frame members 17 which stiffen the case and which serve as supports for the kettle of the invention.

Within the case 10 is disposed a cooking kettle 18 which is constructed with a bottom 19 and with vertical walls 21 extending upwardly therefrom. The vertical walls are connected at their upper ends with upper walls 22 and the various walls are so arranged as to form a channel 23 which extends throughout the major portion of the kettle and which provides a way along which the doughnuts may travel. The kettle 18 has one corner of the same removed, as designated at 24, leaving a main portion 25 of the width of the case 10, and of a length equal to about two-thirds of the length of the same. This construction provides an extension 26 to the kettle which extends up to the end wall 12. Kettle 18 is constructed with a ledge 27, Figs. 2 and 3, extending about the margin of the same which terminates in a lip 28 projecting upwardly from the extreme edge. A guard 29 on the case 10 issues inwardly from the walls thereof and overlies the lip 28, thereby protecting the same and at the same time being spaced therefrom to retard the transmission of heat from the kettle to the case.

The kettle 18 is attached to the channel frame member 17 by means of screws 30 which are threaded into bosses 31 formed on the said kettle.

The channel 23 is arranged to provide a straight run 32 which commences in close proximity to wall 12 and which follows along wall 13. The channel 23 at the end of the run 32 makes a curve 33 which leads into a transverse run 34 extending along the wall 11. This latter run connects with a sharp curved portion 35 which in turn is connected to another straight run 36. The run 36 follows closely along the wall 14. The run 36 is connected to a curved run 37 extending up to the end of the major portion 25 of the kettle at the corner 24 thereof. The run 37 is connected to an S-shaped run 38 generally extending longitudinally of the kettle and disposed adjacent the run 36 and extending in the opposite direction. The S-shaped run 38 is connected with another transverse run 39 which follows along the run 34. Run 39 is connected through a sharp curved portion 41 with another longitudinal run 42 disposed adjacent the run 32 and extending in the opposite direction therefrom. The run 42 discharges into a reservoir 43 which is merely an enlargement of said run. From this reservoir, a short run 44 is provided which is connected by means of a curved run 46 with the beginning of the run 32. A portion of the reservoir 43, the run 44 and the run 45, and the beginning of the run 32 are all disposed in the extension 26 of kettle 18.

The major portion 25 of the kettle 18 is enclosed by means of a hood, not shown in the drawings, which is supported on the uprights 15 at the end wall 11 and two other uprights 47 which are attached to the case at the locality of the portion 25 thereof. The construction of the hood not forming any particular feature of the invention, has not been shown in the drawings, though it can readily be comprehended that any suitable construction may be used for the purpose.

In the reservoir 43 is formed a vertical tubular duct 48 which communicates at its lower end with the said reservoir. In this duct is provided an impeller or elevator 49 which is mounted on the armature shaft of a motor 51. The duct 48 communicates at its upper end with the run 44 of channel 23, thus discharging the cooking liquid from the reservoir 43 and into the run 44 of the channel from which it flows throughout the course of the channel and is returned into the reservoir 43.

Situated at the beginning of the run 32 of channel 23 is a doughnut former 52. This doughnut former comprises a receptacle 53 for raw dough and a suitable cutter 54 connected therewith. Such construction being well known in the art, will not be described in detail in this application. The cutter 54 is periodically operated by means of a shaft 55 which is driven by a transmission, not shown in the drawings, but contained within a case 56 situated in the corner 24 of kettle 18.

For removing the cooked doughnuts from the machine, an ejector 78 is employed which is disposed in the run 42 of channel 23. This ejector comprises a shaft 79 which is continuously driven from the transmission within the housing 56. This shaft has mounted on it oppositely extending cranks 81 and 82. Sets of toothed blades 83 and 84 are mounted on the ends of said cranks and are adapted to be alternately raised and lowered as the shaft rotates. The lower ends of these blades slide upon an inclined rest 85 which is mounted on the bottom of kettle 18 in the portion of the run immediately following the corner 41 of the channel. It will readily be comprehended that, as the doughnuts reach the said blades, the doughnuts are elevated and progressed upwardly and outwardly of the cooking kettle 18. The ejector 78 is disposed within a trough 86 which returns any cooking liquid removed from the doughnuts back into the kettle 18 and which also discharges the doughnuts from the machine.

For controlling the elevation of the cooking liquid in the channel 42, a dam 91 is used which extends across the run 42 of channel 23 at the beginning of the reservoir 43. The cooking liquid, in flowing through the channel 23, passes over this dam which serves as a wier and is maintained at a predetermined elevation thereby.

Control of the rate of travel of the doughnuts to the ejector 78 and to the turner 57 is controlled by means of two control devices 93 and 94. These control devices permit the doughnuts to travel one at a time to the respective device ahead of which they are positioned, so that the output of the doughnut machine and the length of the cooking period is accurately controlled. Inasmuch as these control devices do not form any particular feature of the invention, the same have not been shown in detail and reference to be had to the application for patent of Walter G. Holmes et al., for Doughnut machine, Ser. No. 389,528, filed April 21, 1941, for complete data with reference thereto.

In the run 36 of channel 23 is arranged a twisted tubular turner 57. This turner is constructed with a bottom 58 which, at the inlet to the turner, is horizontal and extends completely across the channel 23. This bottom is gradually twisted and, viewed in the direction of the flow of the liquid, is formed with a right-hand twist. The twist in the said bottom is of such a degree that at the point 59, as shown in Fig. 1, the surface of said bottom is vertical. It will thus be seen that the bottom 58 has gradually been changed into a side wall which is designated by the reference numeral 61. The side wall 61 is twisted beyond the vertical, so that the twist is in excess of 90°. A wall 62, connected to the wall 61 at the point 63 recedes back toward the wall 21 of the kettle 18 to close the space behind the turner.

At the head of the turner, a vertically extending side wall 64 is provided which meets the bottom 58 and lies tight up against one of the side walls 21 of the kettle 18. This gradually merges with the wall 61, said latter wall forming a continuation thereof.

At the head end of the turner and on the side thereof opposite the wall 64 is another vertical side wall 65. This side wall is gradually twisted similarly to the bottom 58, until the same, at the locality 59, lies horizontally instead of vertically and forms a bottom 66 which takes the place of the bottom 58. This bottom is further twisted to correspond to the additional twisting of the wall 19 beyond the point 59.

Figure 3:
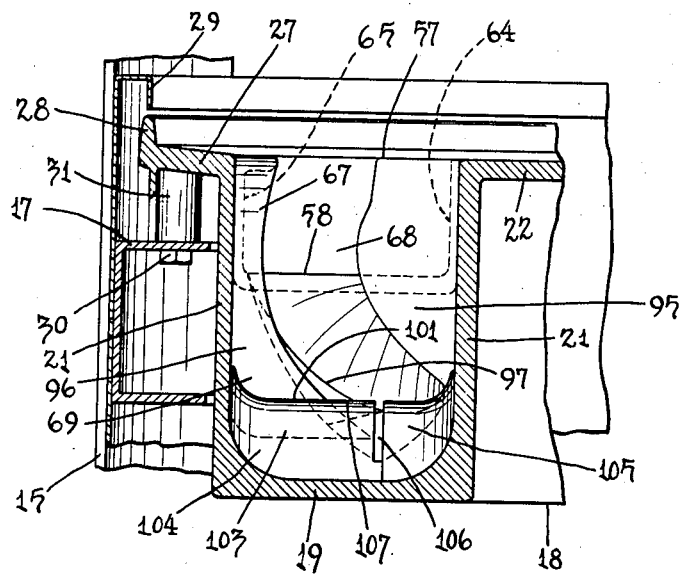
Fig. 3 is a cross-sectional view similar to Fig. 2 and taken on line 3—3 of Fig. 1.
Figure 2:
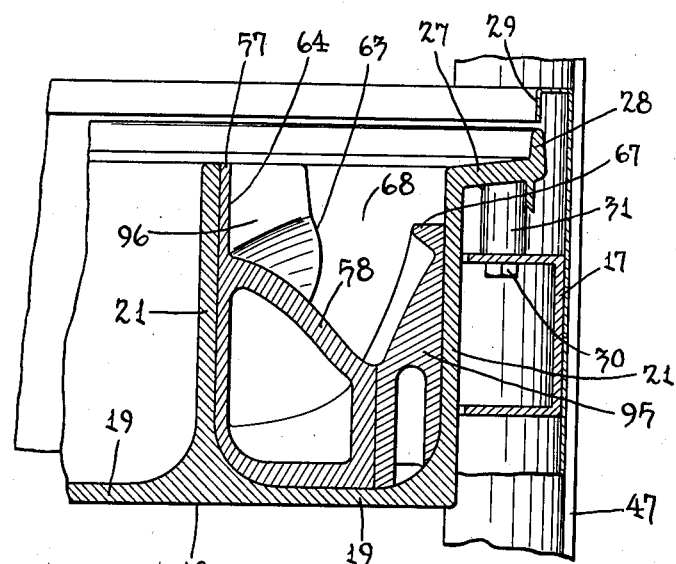
Fig. 2 is a fragmentary, cross-sectional view taken on line 2—2 of Fig. 1 and drawn to a greater scale.

Issuing inwardly from the wall 65 is a lip 67, best shown in Figs. 1, 2 and 3, which lies parallel with the bottom 58 and has the same twist as said bottom. This twist terminates at the locality 59. By means of the construction described, a channel 68 through the turner is provided which is complete throughout its extent on the left hand side of the turner as viewed in the direction of the travel of the cooking liquid, but which is only partly complete on the right hand side. The space between the lip 67 and the adjacent wall 21 of the kettle 18 is bridged over by means of a ledge 69. This ledge forms the uppermost portion of said lip and slopes gradually downwardly toward the bottom 19 of the kettle 18.

The turner 57 is preferably formed as a casting and is cast in two parts 95 and 96. These parts are joined along an irregular line 97, best shown in Fig. 1, which permits the parts to be readily cast and also permits of taking apart the turner to assemble and disassemble the same and to clean the turner after use.

Figure 4:
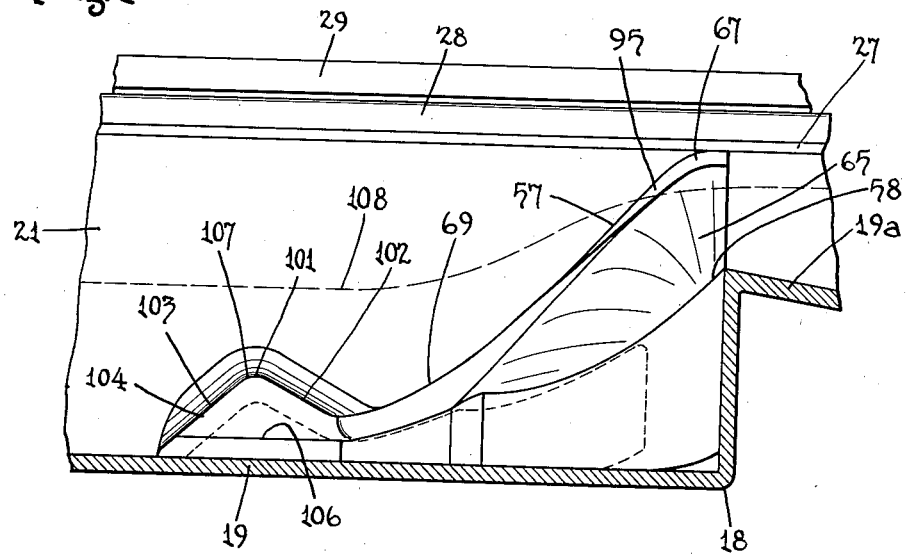
Fig. 4 is a longitudinal elevational sectional view taken on line 4—4 of Fig. 1.
Figure 5:
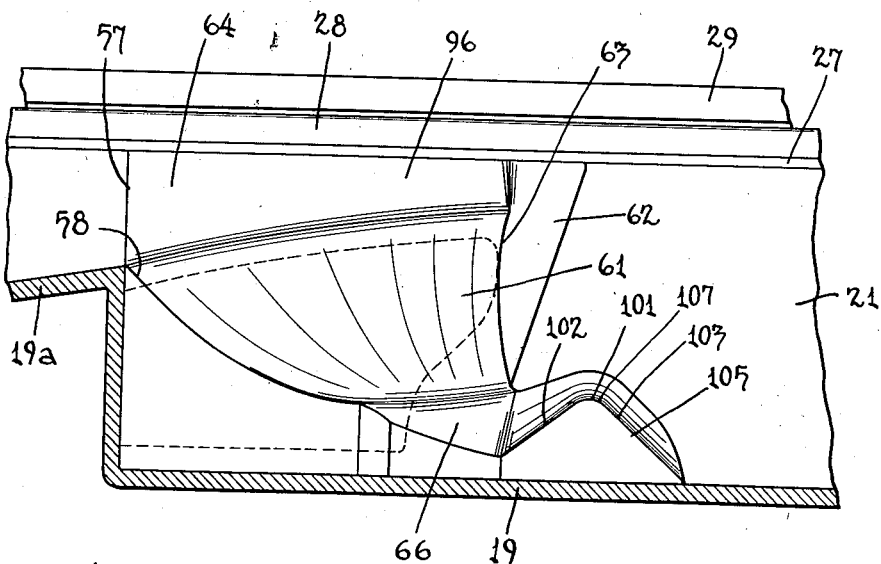
Fig. 5 is a view similar to Fig. 4 taken on line 5—5 of Fig. 1.

It will be noted in Fig. 4 that the bottom 19 of kettle 18 at the locality of the turner 57 is considerably lower than the portion of the said bottom in advance of said turner and is designated by the reference numeral 19ª. This portion of the bottom is at the elevation of the upper surface of the bottom 58 of said turner at the inlet thereto. The passageway 68 is hence caused to slope rapidly downwardly in the direction of the flow of the cooking liquid, causing a rapid movement of the cooking liquid and the doughnuts through the turner and positive inversion of the doughnuts. Due to this slope, considerable turbulence of the cooking liquid in the channel 23 at the discharge end of the turner results, which frequently causes eddies in the cooking liquid in which the doughnuts would whirl without being advanced. The invention proper serves to control the cooking liquid in a manner to overcome this disadvantage.

The invention proper comprises a flow regulator which I have indicated in its entirety by the reference numeral 101. This flow regulator is in the form of a casting which is formed in continuation of and as a part of the turner 57. The said flow regulator traverses the channel 23 and is of inverted V-shape in cross section. By means of this construction, an inclined surface 102 is provided adjacent the turner 57 and another inclined surface 103 on the opposite side of the surface 102. The surface 102 inclines upwardly and away from the turner, while the surface 103 inclines toward the bottom 19 of the kettle 18. The flow regulator 101 is formed in two parts 104 and 105, which are joined to the parts 95 and 96 of the turner 57 and which are integral therewith. In both the two parts of the said flow regulator is formed a slot 106 which serves to drain the cooking liquid out of the turner and past the said flow regulator, when the machine is being emptied of cooking liquid.

The uppermost portion 107 of the flow regulator 101 is below the level 108 of the cooking liquid, so that the doughnuts may travel freely over the same without striking the flow regulator.

The operation of the invention is as follows: The surface 102 of the flow regulator 101 is so disposed that the cooking liquid passing through the channel 68 of the turner 57 strikes the said surface and is deflected upwardly. Due to the travel of the cooking liquid after leaving this surface, the said portion of the cooking liquid has a momentum which produces longitudinal movement of the cooking liquid in the channel 23. This prevents the formation of eddies in the cooking liquid and reduces the turbulence produced by the turner.

The advantages of my invention are manifest. An extremely simple and practical construction is provided by means of which the turbulence produced in doughnut machines is sufficiently reduced to allow the doughnuts to travel along the channel of the kettle. My invention utilizes no moving parts and may be formed as a part of the turner, so that no additional elements are required to be assembled when placing the turner in the machine. There are no moving parts to wear out or get out of order and the device will operate continuously without interruption, throughout the life of the machine.

Changes in the specific form of my invention, as herein disclosed, may be made within the scope of what is claimed without departing from the spirit of my invention.

Having described my invention, what I claim as new and desire to protect by Letters Patent is:

1. In a doughnut machine in which the doughnuts are progressed along a way through the flow of the cooking liquid, a turner having a twisted passageway therethrough and causing a turbulence in the cooking liquid at the outlet of said turner and a flow regulator in said way at the outlet of said turner, said regulator having a deflecting surface traversing the way and extending in angular relation with reference to the direction of travel of the cooking liquid on leaving the turner for the purpose of deflecting the direction of movement of the cooking liquid to reduce the turbulence and produce more uniform flow along the way.

2. In a doughnut machine in which the doughnuts are progressed along a way through the flow of the cooking liquid, a turner having a twisted passageway therethrough and causing a turbulence in the cooking liquid at the outlet of said turner and a flow regulator in said way at the outlet of said turner, said regulator having a deflecting surface traversing the way and extending angularly upwardly and away from the turner.

3. In a doughnut machine in which the doughnuts are progressed along a way through the flow of the cooking liquid, a turner having a twisted passageway therethrough and causing a turbulence in the cooking liquid at the outlet of said turner, a regulator traversing said way and having an inverted V-shaped cross section, said regulator being formed with a deflecting surface against which the cooking liquid, on leaving the turner, impinges.

4. In a doughnut machine in which the doughnuts are progressed along a way through the flow of the cooking liquid, a turner having a twisted passageway therethrough and causing a turbulence in the cooking liquid at the outlet of said turner, a regulator traversing said way and having an inverted V-shaped cross section and formed with a deflecting surface against which the cooking liquid, on leaving the turner, impinges, the base of said regulator being substantially at the lowermost portion of the passageway through said turner and the apex thereof being a distance below the surface of the cooking liquid in the portion of the channel in which it is situated greater than one-half the thickness of a doughnut.

5. In a doughnut machine in which the doughnuts are progressed along a way through the flow of the cooking liquid, a turner having a twisted passageway therethrough and causing a turbulence in the cooking liquid at the outlet of said turner, a regulator traversing said way and having an inverted V-shaped cross section, said regulator being formed with a deflecting surface against which the cooking liquid, on leaving the turner, impinges, and a duct extending through said regulator in the direction of travel of the cooking liquid.

6. In a doughnut machine in which the doughnuts are progressed along a way through the flow of the cooking liquid, a turner having a twisted passageway therethrough and causing a turbulence in the cooking liquid at the outlet of said turner, a regulator traversing said way and having an inverted V-shaped cross section, said regulator being formed with a deflecting surface against which the cooking liquid, on leaving the turner, impinges, and a slot formed in said regulator and extending through the same in the direction of travel of the cooking liquid.

7. In a doughnut machine in which the doughnuts are progressed along a way through the flow of the cooking liquid, a turner having a twisted passageway therethrough and causing a turbulence in the cooking liquid at the outlet of said turner, a regulator traversing said way and having an inverted V-shaped cross section, said regulator being formed with a deflecting surface against which the cooking liquid, on leaving the turner, impinges, said deflector being attached to and carried by said turner.

ALEXANDER S. T. LAGAARD.